(12) United States Patent
Rathay et al.

(10) Patent No.: US 12,735,170 B2
(45) Date of Patent: Sep. 15, 2026

(54) VEHICLE HAVING A BODY WITH A NOSE SECTION

(71) Applicant: GENERAL ELECTRIC COMPANY, Schenectady, NY (US)

(72) Inventors: Nicholas William Rathay, Rock City Falls, NY (US); Gregory Alexander Natsui, Schenectady, NY (US)

(73) Assignee: General Electric Company, Evendale, OH (US)

( * ) Notice: Subject to any disclaimer, the term of this patent is extended or adjusted under 35 U.S.C. 154(b) by 22 days.

(21) Appl. No.: 18/472,800

(22) Filed: Sep. 22, 2023

(65) Prior Publication Data

US 2025/0100671 A1 Mar. 27, 2025

(51) Int. Cl.
*B64C 1/38* (2006.01)
*B64C 30/00* (2006.01)

(52) U.S. Cl.
CPC ................ *B64C 1/38* (2013.01); *B64C 30/00* (2013.01)

(58) Field of Classification Search
CPC .................................... B64C 1/38; B64C 3/36
See application file for complete search history.

(56) References Cited

U.S. PATENT DOCUMENTS 3,119,333 A * 1/1964 Loughran ................. B64C 1/38 244/119
3,267,857 A 8/1966 Lindberg, Jr.
3,785,591 A * 1/1974 Stalmach, Jr. ............ B64C 1/38 244/171.8
3,808,833 A 5/1974 Allen et al.
3,902,820 A 9/1975 Amos
4,671,348 A 6/1987 Bauer
4,726,548 A 2/1988 Clites
5,257,757 A 11/1993 Paul et al.
5,291,830 A * 3/1994 Zwan ....................... B64G 1/58 102/293
5,452,866 A 9/1995 Bulman (Continued)

FOREIGN PATENT DOCUMENTS

CN 108423154 A * 8/2018 ............... B64C 1/38
CN 108438205 A * 8/2018

(Continued)

*Primary Examiner* — Joseph W Sanderson
(74) *Attorney, Agent, or Firm* — Hanley, Flight & Zimmerman, LLC

(57) ABSTRACT

A vehicle having a body extending between a nose section and a tail section. The nose section terminating at a tip. The body having a centerline axis extending from the tip. The nose section having an outer wall terminating at the tip. The outer wall including an outer wall centerline axis, an inner surface and an outer surface. The outer wall having a thickness between the inner surface and the outer surface, when viewed in a horizontal plane extending along the centerline axis; wherein the inner surface has a nose thickness ($t_{nose}$) at the tip; and the outer wall has a local thickness ($t_{local}$) offset from the tip along the outer wall centerline axis, the local thickness ($t_{local}$) being larger than the nose thickness ($t_{nose}$).

19 Claims, 2 Drawing Sheets

(56) References Cited

U.S. PATENT DOCUMENTS

| | | | | |
|---|---|---|---|---|
| 5,901,929 | A | 5/1999 | Banks et al. | |
| 6,367,740 | B1 | 4/2002 | Johnson et al. | |
| 7,232,093 | B2 | 6/2007 | Behrens et al. | |
| 11,260,953 | B2 * | 3/2022 | Rathay | F28F 13/003 |
| 11,260,976 | B2 * | 3/2022 | Gerstler | B64C 5/00 |
| 11,267,551 | B2 * | 3/2022 | Sommerer | B64C 3/36 |
| 11,352,120 | B2 * | 6/2022 | Rathay | B64C 1/38 |
| 11,408,349 | B2 | 8/2022 | Sawyers-Abbott et al. | |
| 11,577,817 | B2 | 2/2023 | Hofer et al. | |
| 2021/0147060 | A1 * | 5/2021 | Sommerer | B64C 1/38 |
| 2021/0147061 | A1 * | 5/2021 | Rathay | F28F 13/003 |
| 2021/0147086 | A1 | 5/2021 | Rathay et al. | |
| 2021/0147087 | A1 * | 5/2021 | Gerstler | B64C 1/38 |
| 2021/0147088 | A1 * | 5/2021 | Rathay | B64C 1/38 |
| 2023/0278695 | A1 * | 9/2023 | Rathay | B64C 30/00 244/117 A |

FOREIGN PATENT DOCUMENTS

| | | | | | |
|---|---|---|---|---|---|
| CN | 116280164 | A | * | 6/2023 | |
| CN | 117326046 | A | * | 1/2024 | B64C 1/38 |

* cited by examiner

VEHICLE HAVING A BODY WITH A NOSE SECTION

GOVERNMENT SPONSORED RESEARCH

The project leading to this application has received funding from the Defense Advanced Research Projects Agency under grant contract No. FA8650-20-C-7011.

TECHNICAL FIELD

The disclosure generally relates to a vehicle having a body with a nose section, and more specifically to the geometry of the nose section.

BACKGROUND

Some vehicles, for example aircrafts, include a body extending between a nose and a tail, and at least two wings extending from the body. The aircraft can include one or more engines mounted to the wing or the fuselage to generate a thrust. During operation of the aircraft, a streamline airflow flows around the nose, over the wings, and ultimately past the tail. In some instances, the streamline airflow at the nose can be compressed, causing a layer of air between the nose and the streamline airflow to be heated. To counter this heating, aircraft can utilize a cooling circuit, specifically transpiration cooling, to cool the nose. Transpiration cooling is done by supplying a cooling fluid to an interior portion of the nose and exhausting the cooling fluid to an exterior portion of the nose through a porous material provided along the nose. The cooling fluid on the exterior of the nose then follows the streamline airflow along the body, thus creating a film of cooling fluid over a portion of the body. This film of cooling fluid effectively insulates the nose and other parts of the body from thermal contact with the streamline airflow.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
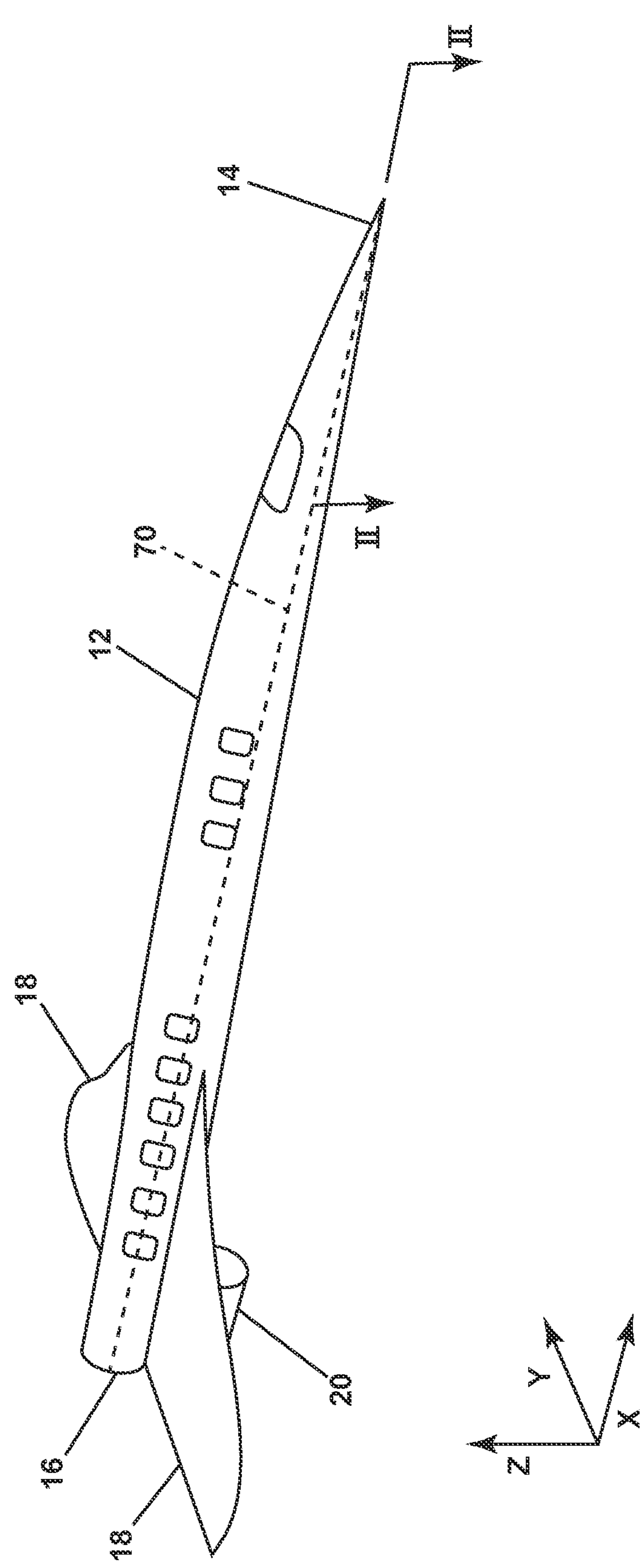
FIG. 1 is a schematic perspective view of a vehicle including a body extending between a nose section and a tail section.

Aspects of the disclosure herein are directed to a vehicle having a body extending between a nose section and a tail section. The nose section terminates at a tip and has an outer wall. The outer wall has a thickness that is flared moving from the tip in the aft direction. The flared area of the nose section can further include a porous material that allows for a transfer of cooling fluid through the other wall of the nose section.

As used herein, the thickness or flared construction of the nose section will be referred to as the geometry of the nose section, while the inclusion of the porous material will be referred to as the composition of the nose section. The geometry and composition of the nose section allows for an increased efficiency when cooling the nose section through transpiration cooling.

For purposes of illustration, the present disclosure will be described with respect to a nose section for a vehicle, specifically a supersonic vehicle or hypersonic vehicle. As used herein, the term "supersonic", 'supersonic aircraft" or iterations thereof refers to an aircraft capable of flying at speeds exceeding or at the speed of sound (e.g., greater than or equal to Mach 1). As used herein, the term "hypersonic", "hypersonic aircraft" or iterations thereof refers to supersonic vehicles that travel substantially faster than the speed of sound, specifically greater than or equal to Mach 5. It will be understood, however, that aspects of the disclosure described herein are not so limited and can have general applicability within any suitable vehicle. For example, the disocclusion can have applicability for a nose section in an aircraft. For example, the disclosure can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

As used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

In certain exemplary embodiments of the present disclosure, a vehicle with a nose section is provided. During operation of the vehicle, a streamline airflow can flow against a portion of the nose section of the vehicle. The streamline airflow flowing against the nose section can have a kinetic energy. The kinetic energy is converted to an internal energy, in the form of heat, and transferred to the nose section. The faster the vehicle goes, the higher the kinetic energy, and the higher the internal energy or heat that is transferred to the nose section. A vehicle that flies at supersonic speeds will experience larger heating of the nose section when compared to a vehicle that flies at subsonic speeds.

To counteract the heating of the nose section, the vehicle includes a cooling circuit that is used to feed a cooling fluid through a portion of the nose section to create a film of cooling fluid along the nose section. The film of cooling fluid insulates the nose section from the heat of the streamline airflow. Hypersonic vehicles will experience even higher heating along the nose section when compared to a supersonic vehicle traveling at less than Mach 5.

A geometry and composition of the nose section is described below that is designed for higher speeds where the temperature of the compressed streamline airflow is higher. The geometry and composition cools or insulates the nose section from the streamline airflow. The geometry and composition may efficiently reduce the footprint and weight of the cooling circuit required to cool the nose section.

FIG. 1 is a schematic perspective view of a vehicle 10 including a body 12. The vehicle 10 can be any suitable vehicle such as, but not limited to, an aircraft. The vehicle 10 can include a center of gravity 44.

The body 12 extends between a nose section 14 and a tail section 16. The nose section 14 terminates at a tip 40. The body 12 includes a centerline axis 70 extending from the tip 40 of the nose section 14 and to the tail section 16. The tip 40 defines an axially forwardmost portion of the body 12 along the centerline axis 70. The centerline axis 70 can intersect or be offset from the center of gravity 44. The centerline axis 70 can be used to create an XYZ coordinate system where the x-axis is parallel to the centerline axis 70. A set of wings 18 are provided along the body 12. The set of wings 18 can be formed as part of the body 12 (e.g., the body 12 can be shaped such that the body 12 define the set of wings 18) or the set of wings 18 can form discrete bodies that extend radially from the body 12. There can be any number of one or more wings in the set of wings 18. The vehicle 10 can include a set of engines 20. As illustrated, the set of engines 20 can be a set of turbine engines, however, any suitable engine is contemplated. There can be any number of one more engines of the set of engines 20.

During operation of the vehicle 10, the set of engines 20 generate a thrust to propel the vehicle 10. The set of wings 18 can include one or more additional components not illustrated (e.g., ailerons, rudders, elevators, etc.) to move the vehicle 10.

Figure 2:
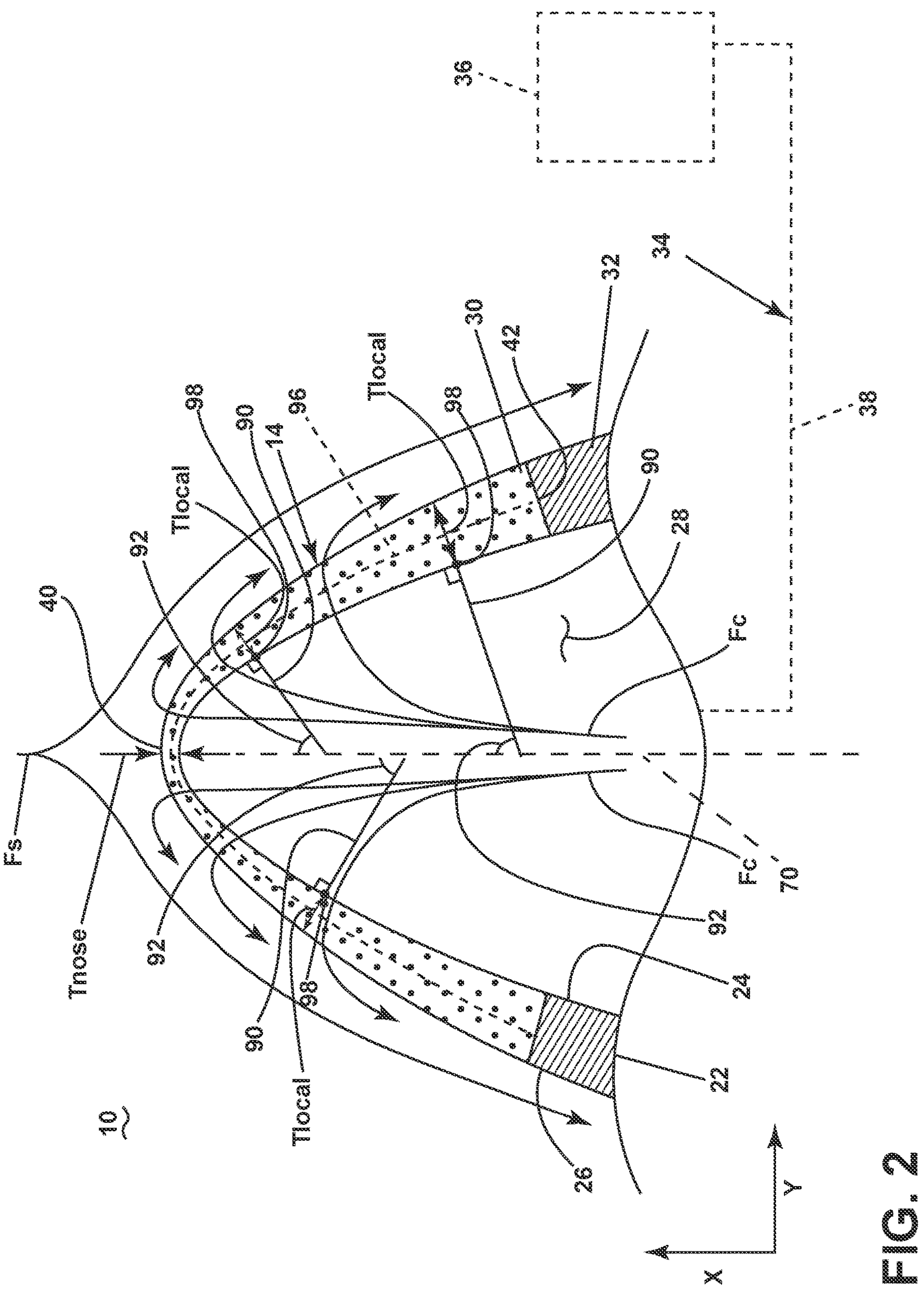
FIG. 2 is a schematic cross-sectional view of the nose section as seen from sectional line II-II of FIG. 1, the nose section terminating at a tip and including an outer wall having a thickness defining a flared cross-section from the tip and in the aft direction.

FIG. 2 is a schematic cross-sectional view of the nose section 14 as seen along sectional line II-II of FIG. 1. The nose section 14 includes an outer wall 22. The outer wall 22 includes an inner surface 24 and an outer surface 26. The outer surface 26 defines an exterior surface of the nose section 14. The outer wall 22 includes an outer wall centerline axis 96 equidistant between the inner surface 24 and the outer surface 26.

A nose interior 28 of the nose section 14 can be at least partially defined by the inner surface 24 of the outer wall 22. The nose interior 28 can be defined by a completely hollow portion of the nose section 14, as illustrated, or a partially hollow portion of the nose section 14.

The nose section 14 can include various sections defined by the material of the nose section 14. The nose section 14 can include a porous material 30. As used herein, the term "porous material" can refer to any material with a high enough permeability to allow fluids such as, but not limited to, air, CO2, N2, steam, liquid H2O (or other liquids), lithium (or other liquid metals), or any combination thereof, to pass through the porous material 30. The porous material 30 can have any suitable porosity such as, but not limited to, greater than or equal to 10% and less than or equal to 50%. As a non-limiting example, the porous material 30 can be, but is not limited to, high temperature metals, high-temperature ceramics, or a combination thereof. As a non-limiting example, high-temperature metals can include, but are not limited to, refractory high entropy alloys, Ni-based superalloys, TZM, C103, or the like. As a non-limiting example, high-temperature ceramics can include, but are not limited to, carbon-carbon, CMCs, ultra-high temperature ceramics, or the like. The porous material 30 can be provided along any suitable portion of the outer wall 22.

The nose section 14 can further include a non-porous material 32. The non-porous material 32 can be any suitable material that does not allow a fluid, such as air, to pass through the non-porous material 32. Conversely, the porous material 30 can allow a fluid, such as air, to pass through it. The porous material 30 can transition to the non-porous material 32 at a transition point 42. It will be appreciated that the porous material 30 can be continuously or non-continuously provided over an extent of the nose section 14. As a non-limiting example, the nose section 14 can include at least a portion of the non-porous material 32 within the illustrated portion of the porous material 30.

The outer wall 22 can include a set of localized positions 98 provided along the inner surface 24. The set of localized positions 98 are spaced axially along the inner surface 24 with respect to the outer wall centerline axis 96. A straight line 90 can be drawn from a respective localized position of the set of localized positions 98 and intersect the centerline axis 70 at an angle 92. Each straight line 90 extends perpendicularly from the inner surface 24 where the localized position is provided along the inner surface 24. For purposes of illustration, three angles 92 and three straight lines 90 are illustrated, however, it will be appreciated that there can be any number of one or more angles 92 and accompanying straight lines 90. It is contemplated that the angle 92 can be used to identify where the localized position is provided. For example, it is contemplated that all angles 92 that are axially aft of the inner surface 24 at the tip 40 can be non-zero or otherwise include an absolute value that is greater than zero. In other words, the only angle 92 that is zero is where the inner surface 24 is at the tip 40. It is contemplated that the angles 92 can increase constantly or non-constantly axially from the tip 40 along the outer wall centerline axis 96.

The set of localized positions 98, defined by the angle 92 and the straight line 90, are used to define locations along the outer wall 22 and the composition and geometry of the position. For example, each localized positions defines a location along the outer wall 22 having a respective thickness and a respective permeability.

As a non-limiting example, the inner surface 24 at the tip 40 is a localized position having a nose thickness ($t_{nose}$) and a nose permeability ($K_{nose}$). The nose thickness ($t_{nose}$) is defined as the straight line distance between the inner surface 24 at the tip 40 to the outer surface 26 at the tip 40, with the straight line distance being parallel to the straight line 90 intersecting the localized position of the inner surface 24 at the tip 40.

As a non-limiting example, the outer wall 22 can include a local thickness ($t_{local}$) and a local permeability ($K_{local}$). The local thickness ($t_{local}$) is defined as the straight line distance between the inner surface 24 at a respective localized position to the outer surface 26, with the straight line distance being parallel to the straight line 90 intersecting the respective localized position of the inner surface 24. The local thickness ($t_{local}$) is offset from the tip 40 along the outer wall centerline axis 96.

The nose thickness ($t_{nose}$) is a minimum thickness of the nose section 14, while the local thickness ($t_{local}$) is greater than the nose thickness ($t_{nose}$). The local thickness ($t_{local}$) can gradually increase in size as the localized position of the local thickness ($t_{local}$) moves aft of or downstream from the tip 40 (the nose thickness ($t_{nose}$)) along the outer wall centerline axis 96. The increase of the thickness along the outer wall centerline axis 96 aft of the tip 40 defines a flared cross-section of the outer wall 22.

The local thickness ($t_{local}$) linearly or non-linearly increase in size from the tip 40 along the outer wall centerline axis 96. It will be appreciated, however, that at least a portion of the outer wall 22 aft of the tip 40 can decrease in thickness to define features along the outer wall 22 such as, but not limited to, a bump, a depression, a divot, or a combination thereof. As a section of the nose section 14 can decrease in thickness, but the thickness of the nose section 14 still increases from the tip 40 to a rearmost position of the porous material 30, the nose section 14 can be said to generally increase in size from the nose thickness ($t_{nose}$) to an axially rearward thickness of the plurality of local thicknesses ($t_{local}$) to define the flared cross-section.

It will be appreciated that the nose section 14 can be symmetric or non-symmetric about the centerline axis 70. As a non-limiting example, the porous material 30 can be symmetric or non-symmetric about the centerline axis 70.

The vehicle 10 can include a cooling circuit 34 having a cooling fluid source 36 and a fluid duct 38. The cooling fluid source 36 can be any suitable source of cooling fluid such as, but not limited to, a reservoir (e.g., a reservoir having a compressed cooling fluid), the set of engines 20 (FIG. 1) as a bleed air from a portion of the set of engines 20, or any combination thereof. The cooling fluid source 36 can be provided within any suitable portion of the vehicle 10. The fluid duct 38 is fluidly coupled to a portion of the nose section 14. As a non-limiting example, the fluid duct 38 is directly fluidly coupled to the nose interior 28.

During operation of the vehicle 10, a streamline airflow (Fs) flows against the nose section 14. The streamline airflow (Fs) includes kinetic energy as it flows against the nose section 14 that is a function of the speed of the vehicle 10. The kinetic energy of the streamline airflow (Fs) is converted to an internal energy, which is transferred to the nose section 14 in the form of a heat. The conversation of the kinetic energy of the streamline airflow (Fs) to internal energy in the form of heat will be hereinafter referred to as the heating of the nose section 14. The heat transferred to the vehicle 10 is greatest at the tip 40 of the nose section 14. As the vehicle 10 moves faster, the streamline airflow (Fs) includes more kinetic energy and more heat is transferred to the nose section 14.

The cooling circuit 34 can selectively supply cooling fluid (Fc) from the cooling fluid source 36 through the fluid duct 38 to the nose section 14. The cooling fluid (Fc) flows through the nose interior 28 and impinge respective portions of the inner surface 24 of the outer wall 22. The cooling fluid (Fc) flows through the porous material 30 of the outer wall 22 and to the outer surface 26. Once on the outer surface 26, the cooling fluid (Fc) moves with the streamline airflow (Fs) and creates a film of cooling fluid (Fc) between the streamline airflow (Fs) and the outer surface 26 of the nose section 14. The film of cooling fluid (Fc) insulates the nose section 14 from the streamline airflow (Fs), ensuring that the streamline airflow (Fs) does not overheat the nose section 14. This movement of the cooling fluid (Fc) through the porous material 30 is a form of transpiration cooling.

More cooling is generally required as the vehicle 10 moves faster. In cases where the vehicle 10 is a supersonic vehicle traveling at supersonic speeds, the heat that is generated can cause damage to the vehicle 10. In cases where the vehicle 10 is a hypersonic vehicle traveling at hypersonic speeds, the heat that is generated at the nose section 14 is generally larger than the heat that is generated at the nose section 14 of supersonic vehicle traveling at supersonic speeds. The heat that is generated at the nose section 14 of subsonic vehicle is generally negligible and cooling may not be required.

The heating of the nose section 14 of a conventional vehicle may be characterized by a plurality of heat fluxes. Each section of the nose section 14 can be defined by a respective heat flux. The heat flux is defined as the predicted, measured, or otherwise anticipated flow of energy (e.g., heat) between the streamline airflow (Fs) and a respective portion of the nose section 14. A nose heat flux ($q_{nose}$) can be experienced at the tip 40 and a local heat flux ($q_{local}$) can be experienced aft of the tip. In some instances, the nose heat flux ($q_{nose}$) or the local heat flux ($q_{local}$) can be high enough to cause damage to a respective portion of the nose section 14 of the conventional vehicle.

In the conventional vehicle (e.g., a vehicle without the flared nose section 14 or constant permeability), a thermal gradient is created between the tip 40 and a location offset from the tip 40, with the temperature at the tip 40 being the highest. An even distribution of cooling fluid does not fit the temperature gradient. The cooling fluid distribution may sufficiently cool the tip 40 but locations of the nose section 14 aft of the tip 40 will receive an amount of cooling fluid that is more than what is needed to sufficiently cool the nose section 14. The nose section 14 will be overly cooled and cooling fluid is wasted. An inefficient cooling system generally requires a cooling circuit with a larger footprint and that has more weight.

The cooling system of FIG. 2 efficiently distributes a cooling fluid to the nose section 14 because of at least one of the geometry and composition of the nose section 14. At least one of the geometry and composition of the nose section 14 may be determined according to the calculated, measured, or modeled nose heat flux ($q_{nose}$) and the local heat flux ($q_{local}$).

The geometry of the nose section 14 (e.g., the nose thickness ($T_{nose}$) and the local thickness ($t_{local}$)) and/or the composition of the nose section 14 (e.g., the nose permeability ($K_{nose}$) and the local permeability ($K_{local}$) of the porous material 30) can be varied to efficiently cool the nose section 14. A cooling circuit 34 with less weight and a smaller footprint can be used with the improved geometry and/or composition of the nose section 14.

A ratio between the nose thickness ($t_{nose}$) and the local thicknesses ($t_{local}$) can be determined with respect to a ratio between the nose heat flux ($q_{nose}$) and the local heat flux ($q_{local}$) according to the following relationship:

$$\frac{t_{local}}{t_{nose}} = \frac{q_{nose}}{q_{local}} \tag{1}$$

A ratio between the nose permeability ($K_{nose}$) and the local permeability ($K_{local}$) can be determined with respect to a ratio between the nose heat flux ($q_{nose}$) and the local heat flux ($q_{local}$) according to the following relationship:

$$\frac{K_{local}}{K_{nose}} = \frac{q_{local}}{q_{nose}} \tag{2}$$

The nose heat flux ($q_{nose}$) and the local heat flux ($q_{local}$) can be determined through testing, measurement, modeling, computational fluid dynamic simulations, or the like. Similarly, the nose thickness ($t_{nose}$) and the nose permeability ($K_{nose}$) can be determined through modeling, simulations, real-world testing, measurements, or computational fluid dynamics simulations. As a non-limiting example, the nose thickness ($t_{nose}$) and the nose permeability ($K_{nose}$) can be determined based on the expected nose heat flux ($q_{nose}$).

With values for the nose thickness ($t_{nose}$), the nose heat flux ($q_{nose}$) and the local heat flux ($q_{local}$), the local thickness ($t_{local}$) can be determined through the following relationship:

$$t_{local} = t_{nose}\left(\frac{q_{nose}}{q_{local}}\right) \tag{3}$$

With values for the nose permeability ($K_{nose}$), the nose heat flux ($q_{nose}$) and the local heat flux ($q_{local}$), the local permeability ($K_{local}$) can be determined through the following relationship:

$$K_{local} = K_{nose}\left(\frac{q_{local}}{q_{nose}}\right) \tag{4}$$

It is further contemplated that the local permeability ($K_{local}$) can be calculated through a relationship between the set of local thickness ($t_{local}$), the nose thickness ($t_{nose}$), the nose permeability ($K_{nose}$), the nose heat flux ($q_{nose}$) and the local heat flux ($q_{local}$) through use of following relationship:

$$K_{local} = K_{nose}\left(\frac{t_{local}}{t_{nose}}\right)\left(\frac{q_{local}}{q_{nose}}\right) \tag{5}$$

It is further contemplated that the local thickness ($t_{local}$) can be calculated through a relationship between the local permeability ($K_{local}$), the nose permeability ($K_{nose}$), the nose thickness ($t_{nose}$), the nose heat flux ($q_{nose}$) and the local heat flux ($q_{local}$) through use of following relationship:

$$t_{local} = t_{nose}\left(\frac{K_{local}}{K_{nose}}\right)\left(\frac{q_{nose}}{q_{local}}\right) \tag{6}$$

Use of the fifth relationship (5) or the sixth relationship (6) as opposed to the fourth relationship (4) or the third relationship (3) has been found to be advantageous in the sense that the fifth relationship (5) and the sixth relationship (6) allow for the calculation of the local permeability ($K_{local}$) or the local thickness ($t_{local}$) to be directly dependent on the set of local thickness ($t_{local}$) and the nose thickness ($t_{nose}$), and the local permeability ($K_{local}$) and the nose permeability ($K_{nose}$), respectively. In other words, the local permeability ($K_{local}$) can be calculated as a function of the thickness, while the local thickness ($t_{local}$) can be calculated as a function of the permeability. Using the relationships (5) and (6) rather than the relationships (4) or (3) can further be used to illustrate the relationship between the thickness and the permeability of a respective portion of the nose section 14. In other words, the relationships (5) and (6) can be used to show how the permeability or thickness of the nose section 14 changes with or is otherwise dependent on the other of the permeability or thickness of the nose section 14.

It has been found that the selection of the geometry and composition of the nose section 14, through use of relationships (3), (4), (5) and (6), improves the mass flow rate of the cooling fluid (Fc) to specific locations of the nose section 14. such that the locations of the nose section 14 do not receiving too much or too little cooling fluid (Fc).

It has further been found, through use of the relationships (3), (4), (5) and (6), that tailoring the geometry and composition of the nose section 14 such that the permeability decreases while the thickness increases from the tip 40 to aft of the tip 40 (e.g., the flare) results in a highest amount of cooling fluid (Fc) being fed to the tip 40, where the heating of the nose section 14 is largest, and a lowest amount of cooling (Fc) being fed to the aft portions of the nose section 14 where the heating is lowest.

The selection of the composition and geometry of the nose section 14 through use of the expressions has been found to result in a nose section 14 that has a uniform cooling. In other words, the nose section 14 has a uniform temperature during operation. Put another way, a thermal gradient is not experienced across the nose section 14 during cooling. The conventional vehicle would still experience this thermal gradient across the nose section as some portions of the nose section are cooled more than other sections due to the even distribution of the cooling fluid. The elimination of the thermal gradient in the nose section 14, as describe herein, in turn, reduces or otherwise eliminates a thermal gradient experienced across the nose section 14, which ultimately results in lower thermal stresses across the nose section 14 when compared to the conventional vehicle.

It has been further found that the selection of the geometry and composition of the nose section 14 using the expressions above can be used to ensure optimal cooling for the nose section 14 for supersonic vehicle and more specifically hypersonic vehicle. As discussed herein, the faster that a vehicle goes, the higher the heating along the nose section 14 and therefore the higher amount of cooling needed to effectively shield against the heating. The expressions described herein can be used to design a nose section 14 for the vehicle 10 at all suitable speeds including supersonic and hypersonic vehicles. In other words, the expressions describe herein can be used to ensure that the nose section 14 of a supersonic or hypersonic vehicle will not be overly heated during operation of the supersonic or hypersonic vehicle. As discussed herein, the cooling of the nose section 14 of the hypersonic vehicle is especially important when compared to the cooling of the nose section of the supersonic vehicle that travels at less than Mach 5 or a subsonic vehicle as the hypersonic vehicle will experience much higher heating along the nose section 14.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A vehicle, comprising a body extending between a nose section and a tail section, the nose section terminating at a tip, and the body being defined by a centerline axis extending from the tip, the nose section comprising an outer wall terminating at the tip, the tip defining an axially forwardmost portion of the nose section with respect to the centerline axis, the outer wall including an outer wall centerline axis, an inner surface and an outer surface, the outer wall having a thickness between the inner surface and the outer surface, when viewed in a horizontal plane extending along the centerline axis wherein a nose thickness ($t_{nose}$) at the tip, and a local thickness ($t_{local}$) offset from the tip along the outer wall centerline axis, the local thickness ($t_{local}$) being larger than the nose thickness ($t_{nose}$).

A vehicle, comprising a body extending between a nose section and a tail section, the nose section terminating at a tip, and the body being defined by a centerline axis extending from the tip, the nose section comprising an outer wall terminating at the tip, the tip defining an axially forwardmost portion of the nose section with respect to the centerline axis, the outer wall including an outer wall centerline axis, an inner surface and an outer surface, the outer wall having a thickness between the inner surface and the outer surface, when viewed in a horizontal plane extending along the centerline axis, and a porous material provided along at least a portion of the outer wall wherein a nose permeability ($K_{nose}$) defined by the permeability of the outer wall at the tip, and a local permeability ($K_{local}$) is defined by the permeability of a respective portion of the outer wall axially aft of the tip, with respect to the centerline axis, the local permeability ($K_{local}$) being non-equal to the nose permeability ($K_{nose}$).

The vehicle of any preceding clause, wherein the nose section includes a flared cross-section along the outer wall centerline axis aft of the tip.

The vehicle of any preceding clause, wherein the nose section has a nose heat flux ($q_{nose}$) at the tip and a local heat flux ($q_{local}$) at the respective portion of the outer wall, and the local thickness ($t_{local}$) is defined by the relationship $$t_{local} = t_{nose}\left(\frac{q_{nose}}{q_{local}}\right).$$

The vehicle of any preceding clause, wherein the local thickness ($t_{local}$) linearly increase from the nose thickness ($t_{nose}$) in the aft direction.

The vehicle of any preceding clause, wherein the nose section further includes a porous material provided between the inner surface and the outer surface.

The vehicle of any preceding clause, wherein the nose section has a porous material having a nose permeability ($K_{nose}$) defined by the permeability of the outer wall at the tip, and a local permeability ($K_{local}$) defined by the permeability of a respective portion of the outer wall axially aft of the tip.

The vehicle of any preceding clause, wherein the nose section has a nose heat flux ($q_{nose}$) at the tip and a local heat flux ($q_{local}$) at the respective portion of the outer wall, and the local permeability ($K_{local}$) is defined by the relationship $$K_{local} = K_{nose}\left(\frac{t_{local}}{t_{nose}}\right)\left(\frac{q_{local}}{q_{nose}}\right).$$

The vehicle of any preceding clause, wherein the nose section has a nose heat flux ($q_{nose}$) at the tip and a local heat flux ($q_{local}$) at the respective portion of the outer wall, and the local thickness ($t_{local}$) is defined by the relationship $$t_{local} = t_{nose}\left(\frac{K_{local}}{K_{nose}}\right)\left(\frac{q_{nose}}{q_{local}}\right).$$

The vehicle of any preceding clause, wherein the nose permeability ($K_{nose}$) is larger than the local permeability ($K_{local}$).

The vehicle of any preceding clause, wherein the nose section includes a plurality of local permeabilities that are equal to or non-equal to each other.

The vehicle of any preceding clause, wherein the outer wall defines a nose interior and the vehicle further comprises a cooling circuit at least partially defined by the nose interior and exhausting through the porous material to the outer surface.

The vehicle of any preceding clause, wherein the vehicle is a hypersonic vehicle.

The vehicle of any preceding clause, wherein the vehicle is a supersonic aircraft.

The vehicle of any preceding clause, wherein the nose section has a nose heat flux ($q_{nose}$) at the tip and a local heat flux ($q_{local}$) at the respective portion of the outer wall, and the local permeability ($K_{local}$) is defined by the relationship $$K_{local} = K_{nose}\left(\frac{q_{local}}{q_{nose}}\right).$$

The vehicle of any preceding clause, wherein the nose permeability ($K_{nose}$) is larger than the local permeability ($K_{local}$).

The vehicle of any preceding clause, wherein the nose section includes a thickness between the inner surface and the outer surface, when viewed in the horizontal plane, and the nose section includes a nose thickness ($t_{nose}$) at the tip, and a local thickness ($t_{local}$) axially aft of the tip the local thickness ($t_{local}$) being larger than the nose thickness ($t_{nose}$) such that the nose section includes a flared cross-section along the outer wall centerline axis.

The vehicle of any preceding clause, wherein the nose section has a nose heat flux ($q_{nose}$) at the tip and a local heat flux ($q_{local}$) at the respective portion of the outer wall, and the local permeability ($K_{local}$) is defined by the relationship $$K_{local} = K_{nose}\left(\frac{t_{local}}{t_{nose}}\right)\left(\frac{q_{local}}{q_{nose}}\right).$$

The vehicle of any preceding clause, wherein the vehicle is a hypersonic vehicle.

The vehicle of any preceding clause, wherein the outer wall defines a nose interior and the vehicle further comprises a cooling circuit at least partially defined by the nose interior and exhausting through the porous material to the outer surface.

What is claimed is:

1. A vehicle, comprising:

a body extending between a nose section and a tail section, the nose section terminating at a tip, and the body being defined by a centerline axis extending from the tip, the nose section comprising:

an outer wall terminating at the tip, the tip defining an axially forwardmost portion of the nose section with respect to the centerline axis, the outer wall including an outer wall centerline axis, an inner surface and an outer surface, the outer wall formed of a single layer having a thickness between the inner surface and the outer surface, when viewed in a horizontal plane extending along the centerline axis;

wherein:

the outer wall has a nose thickness ($t_{nose}$) at the tip; and the outer wall has a local thickness ($t_{local}$) offset from the tip along the outer wall centerline axis, the local thickness ($t_{local}$) being larger than the nose thickness ($t_{nose}$), and wherein the nose section includes a porous material provided between the inner surface and the outer surface and the tail section includes a non-porous material, the outer wall including the porous material transitioning to the non-porous material in the single layer at a transition point.

2. The vehicle of claim 1, wherein the nose section includes a flared cross-section along the outer wall centerline axis aft of the tip.

3. The vehicle of claim 1, wherein the nose section has a nose heat flux ($q_{nose}$) at the tip and a local heat flux ($q_{local}$) at a respective portion of the outer wall, and the local thickness ($t_{local}$) is defined by the relationship:

$$t_{local} = t_{nose}\left(\frac{q_{nose}}{q_{local}}\right).$$

4. The vehicle of claim 1, wherein the local thickness ($t_{local}$) linearly increases from the nose thickness ($t_{nose}$) in the aft direction.

5. The vehicle of claim 1, wherein the porous material of the nose section has:

a nose permeability ($K_{nose}$) defined by the permeability of the outer wall at the tip; and a local permeability ($K_{local}$) defined by the permeability of a respective portion of the outer wall axially aft of the tip.

6. The vehicle of claim 5, wherein the nose section has a nose heat flux ($q_{nose}$) at the tip and a local heat flux ($q_{local}$) at the respective portion of the outer wall, and the local permeability ($K_{local}$) is defined by the relationship:

$$K_{local} = K_{nose}\left(\frac{t_{local}}{t_{nose}}\right)\left(\frac{q_{local}}{q_{nose}}\right).$$

7. The vehicle of claim 5, wherein the nose section has a nose heat flux ($q_{nose}$) at the tip and a local heat flux ($q_{local}$) at the respective portion of the outer wall, and the local thickness ($t_{local}$) is defined by the relationship:

$$t_{local} = t_{nose}\left(\frac{K_{local}}{K_{nose}}\right)\left(\frac{q_{nose}}{q_{local}}\right).$$

8. The vehicle of claim 5, wherein the nose permeability ($K_{nose}$) is larger than the local permeability ($K_{local}$).

9. The vehicle of claim 5, wherein the nose section includes a plurality of local permeabilities that are equal to or non-equal to each other.

10. The vehicle of claim 1, wherein the outer wall defines a nose interior and the vehicle further comprises a cooling circuit at least partially defined by the nose interior and exhausting through the porous material to the outer surface.

11. The vehicle of claim 1, wherein the vehicle is a hypersonic vehicle.

12. The vehicle of claim 1, wherein the vehicle is a supersonic aircraft.

13. A vehicle, comprising:

a body extending between a nose section and a tail section, the nose section terminating at a tip, and the body being defined by a centerline axis extending from the tip, the nose section formed in a single layer comprising:

an outer wall terminating at the tip, the tip defining an axially forwardmost portion of the nose section with respect to the centerline axis, the outer wall including an outer wall centerline axis, an inner surface and an outer surface, the outer wall having a thickness between the inner surface and the outer surface, when viewed in a horizontal plane extending along the centerline axis; and a porous material provided along at least a portion of the outer wall;

wherein:

the outer wall has a nose permeability ($K_{nose}$) defined by the permeability of the outer wall at the tip; and the outer wall has a local permeability ($K_{local}$) is defined by the permeability of a respective portion of the outer wall axially aft of the tip, with respect to the centerline axis, the local permeability ($K_{local}$) being non-equal to the nose permeability ($K_{nose}$), and wherein the nose section includes the porous material provided between the inner surface and the outer surface and the tail section includes a non-porous material, the outer wall including the porous material transitioning to the non-porous material in the single layer at a transition point.

14. The vehicle of claim 13, wherein the nose section has a nose heat flux ($q_{nose}$) at the tip and a local heat flux ($q_{local}$) at the respective portion of the outer wall, and the local permeability ($K_{local}$) is defined by the relationship:

$$K_{local} = K_{nose}\left(\frac{q_{local}}{q_{nose}}\right).$$

15. The vehicle of claim 13, wherein the nose permeability ($K_{nose}$) is larger than the local permeability ($K_{local}$).

16. The vehicle of claim 13, wherein the nose section includes a thickness between the inner surface and the outer surface, when viewed in the horizontal plane, and the nose section includes:

a nose thickness ($t_{nose}$) at the tip; and a local thickness ($t_{local}$) axially aft of the tip, the local thickness ($t_{local}$) being larger than the nose thickness ($t_{nose}$) such that the nose section includes a flared cross-section along the outer wall centerline axis.

17. The vehicle of claim 16, wherein the nose section has a nose heat flux ($q_{nose}$) at the tip and a local heat flux ($q_{local}$) at the respective portion of the outer wall, and the local permeability ($K_{local}$) is defined by the relationship:

$$K_{local} = K_{nose}\left(\frac{t_{local}}{t_{nose}}\right)\left(\frac{q_{local}}{q_{nose}}\right).$$

18. The vehicle of claim 13, wherein the vehicle is a hypersonic vehicle.

19. The vehicle of claim 13, wherein the outer wall defines a nose interior and the vehicle further comprises a cooling circuit at least partially defined by the nose interior and exhausting through the porous material to the outer surface.

* * * * *